July 17, 1928.

H. I. MORRIS 1,677,402

APPARATUS FOR MAKING TIRES OR TIRE CARCASSES

Filed Dec. 20, 1924

INVENTOR
Howard I. Morris
BY
ATTORNEY

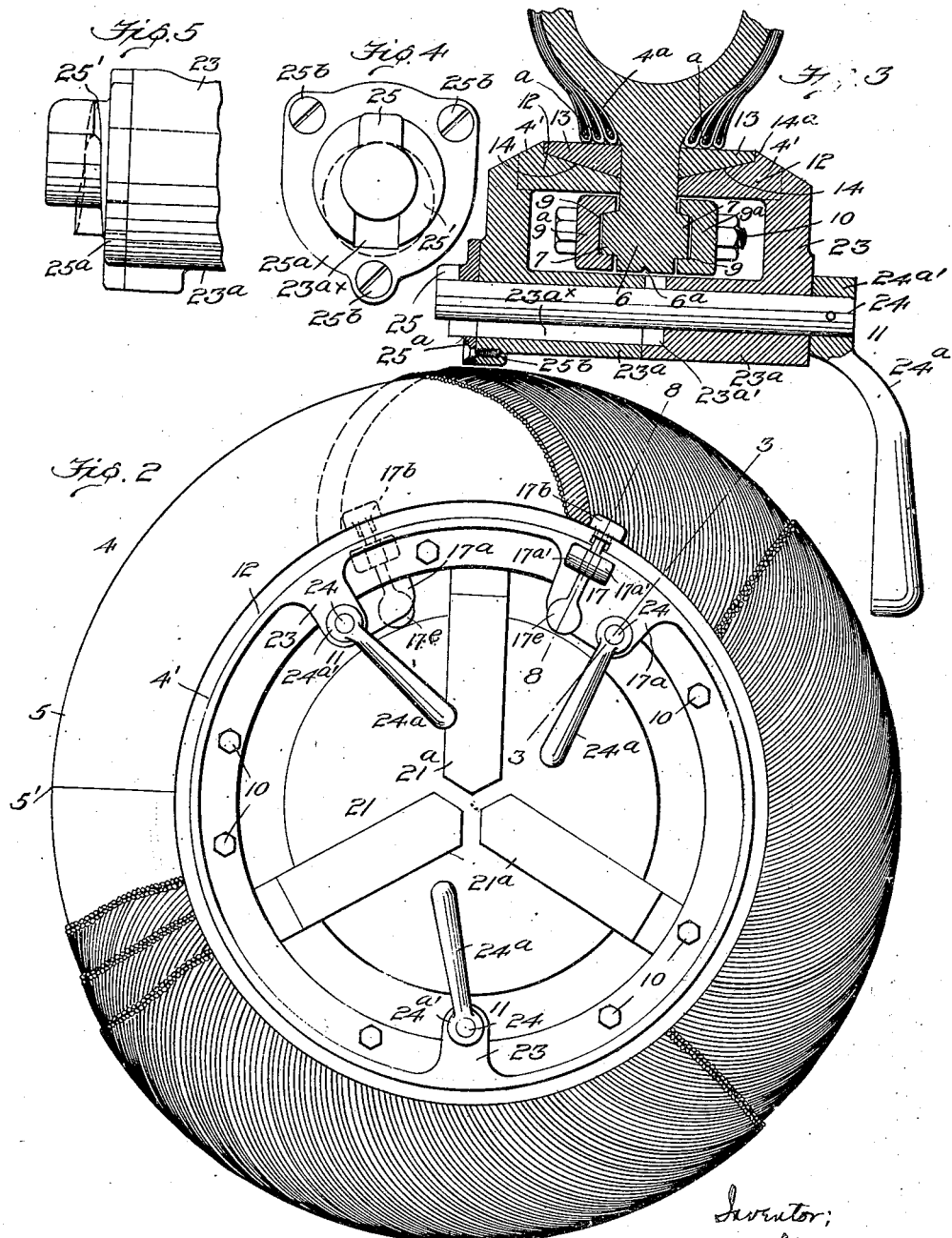

July 17, 1928.
H. I. MORRIS
1,677,402
APPARATUS FOR MAKING TIRES OR TIRE CARCASSES
Filed Dec. 20, 1924
4 Sheets-Sheet 3
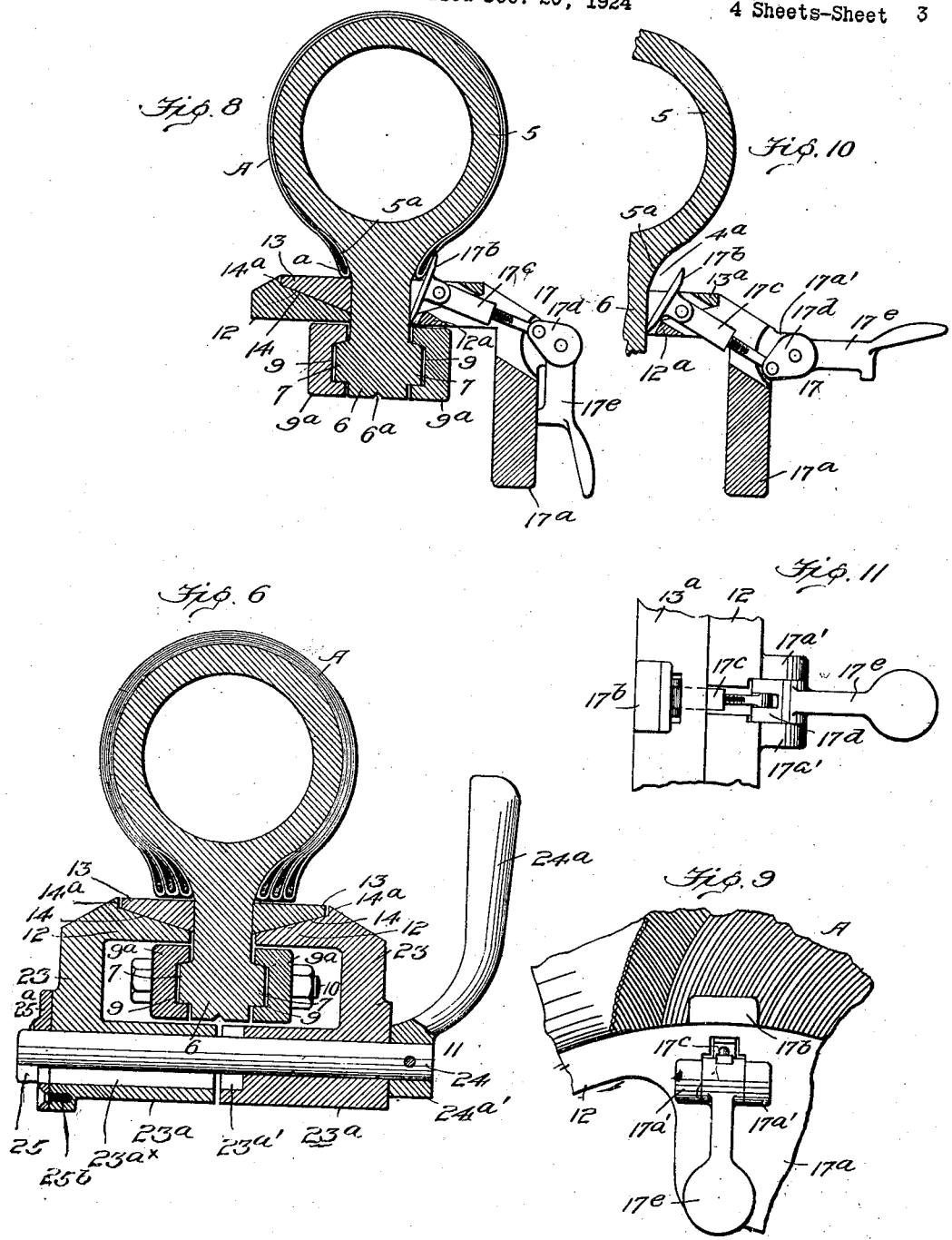

July 17, 1928.
H. I. MORRIS
1,677,402
APPARATUS FOR MAKING TIRES OR TIRE CARCASSES
Filed Dec. 20, 1924
4 Sheets-Sheet 4
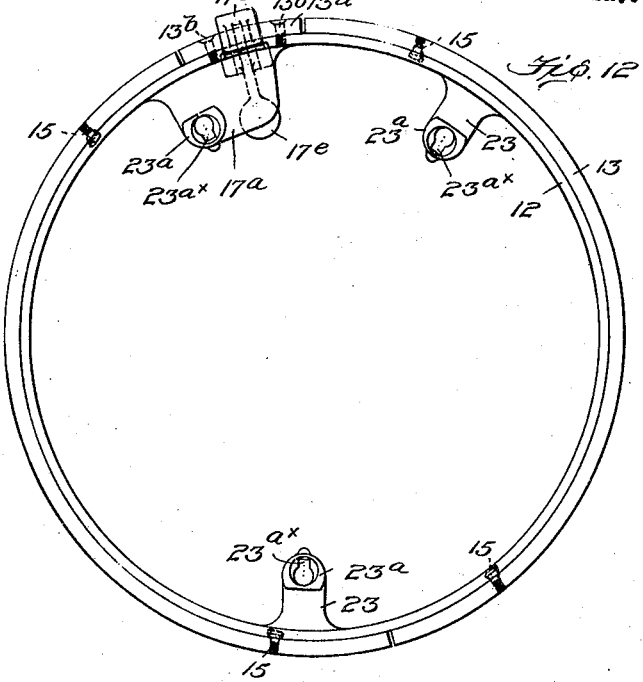
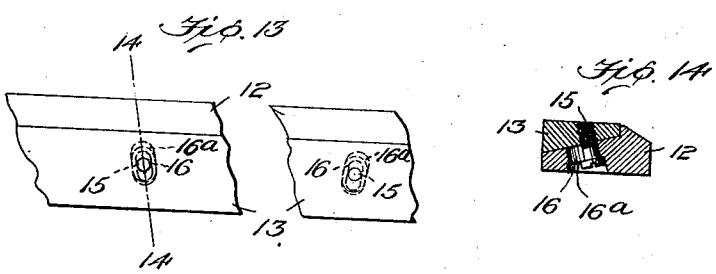
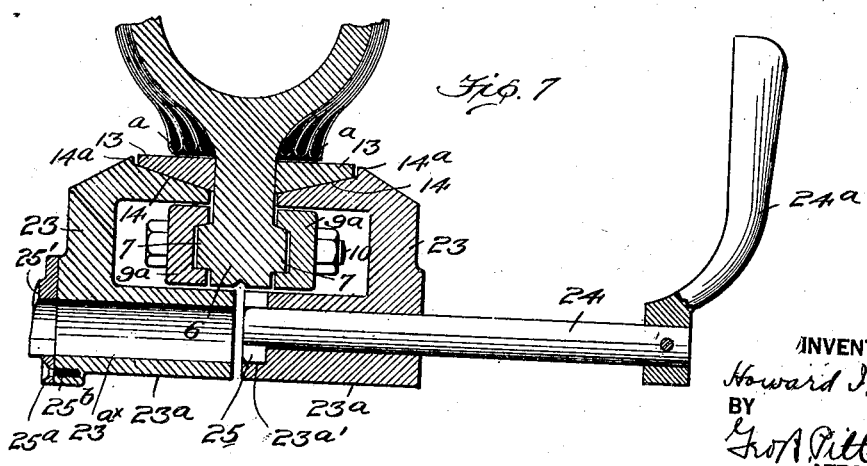
INVENTOR
Howard I. Morris
BY
Geo. A. Pitts
ATTORNEY Patented July 17, 1928.

UNITED STATES PATENT OFFICE.

1,677,402

HOWARD I. MORRIS, OF CLEVELAND, OHIO, ASSIGNOR TO CORD TIRE MACHINE COMPANY, OF CLEVELAND, OHIO, A CORPORATION OF ARIZONA.

APPARATUS FOR MAKING TIRES OR TIRE CARCASSES.

Application filed December 20, 1924. Serial No. 757,136.

This invention relates to an apparatus for making tire carcasses, more particularly of the type in which the material is wound convolutely on a core, preferably in the form of a single web of material wherein is incorporated all the elements or materials, including the beads, entering into the carcass structure.

One object of the invention is to provide an apparatus of this character that is relatively simple in construction and readily operated, whereby the carcass may be made rapidly to increase the output of the apparatus.

Another object of the invention is to provide an improved core structure having bead rings, sections of which are relatively movable to facilitate the disassembly of the core structure and removal of the core body.

Another object of the invention is to provide in a core structure having removable bead rings improved clamping devices for the carcass material and for the bead rings to secure relatively quick assembly and disassembly of the latter into and out of operative relationship.

Other objects of the invention will be apparent to those skilled in the art to which my invention relates from the following description taken in connection with the accompanying drawings, wherein Fig. 1 is a side elevation of an apparatus embodying my invention.

Fig. 2 is a side elevation of a portion of the apparatus showing the chuck and core structure in side elevation, with a portion of the material wound on the latter, the material being broken away to show the several layers or plies thereof.

Fig. 3 is a section on the line 3—3 of Fig. 2.

Fig. 4 is a fragmentary view of parts shown in Fig. 3.

Fig. 5 is a side view of the parts shown in Fig. 4.

Fig. 6 is a section similar to Fig. 3, but showing the clamping devices released with one element thereof in position ready to be withdrawn.

Fig. 7 is a sectional view similar to Fig. 6, but showing the clamping element withdrawn.

Fig. 8 is a section on the line 8—8 of Fig. 2.

Fig. 9 is a fragmentary side view of parts shown in Fig. 8.

Fig. 10 is a fragmentary section similar to Fig. 8, but showing the bead clamp in unlocked position.

Fig. 11 is a plan view of the parts shown in Fig. 10.

Fig. 12 is a view of one of the bead rings.

Fig. 13 is a fragmentary top plan view of a bead ring.

Fig. 14 is a section on the line 14—14 of Fig. 13.

Figure 1:
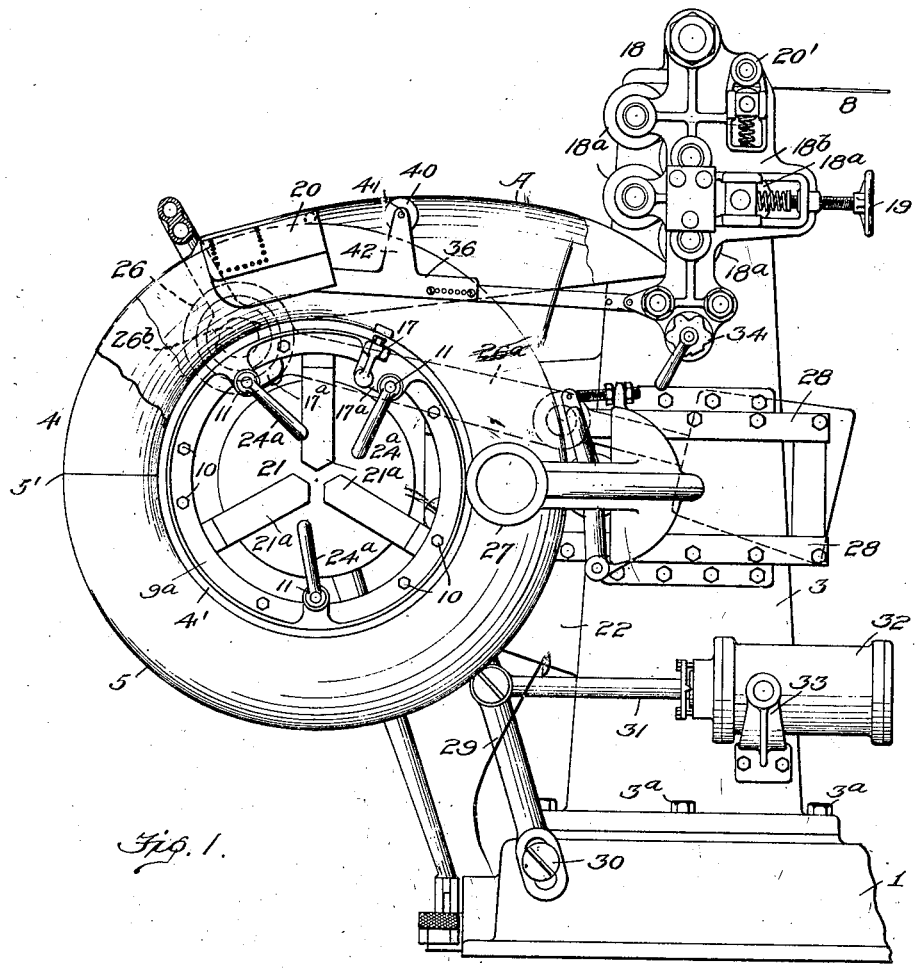

I have, for illustrative purposes, shown my invention as applied to a machine for making tire carcasses wherein the material of which the carcass is made, is continuously fabricated into a composite web A having beads $a$ which is convolutely wound on a core to provide the carcass with the desired number of plies of material. This machine, a portion of which is shown in Fig. 1 of the accompanying drawings, forms the subject material of my co-pending application, Serial No. 705,654.

Referring to Fig. 1, 1 indicates a base of any desired construction, one end only of which is shown. 3 indicates a standard supported on the base 1 and preferably secured thereto by cap screws $3^a$. The standard 3 supports a consolidating and feeding mechanism, indicated as an entirety at 18, and also the bead and body rolling down mechanisms 26 and 27, respectively, which form the subjects-matter of separate co-pending applications Serial Nos. 750,127 and 736,349, respectively.

In my co-pending application, Serial No. 705,654, the various materials are continuously supplied, then associated with and guided by a platen 8 to the consolidating mechanism 18, by means of which the materials are consolidated or compressed into the unitary, composite beaded web A, which is then fed in substantially a tangential direction to the core structure indicated as an entirety at 4, the beads $a$ engaging with and being positioned on the bead rings 4' of the core structure and the body portion of the web A being guided on to the core body 5 by a guide shoe, (indicated as an entirety at 20), preferably of the construction disclosed and claimed in my co-pending application, Serial No. 740,750; this arrangement serving to permit convolute winding of the beaded web A on the core structure with the beads $a$ helically disposed in side by side relation.

The consolidating and feeding mechanism 18 preferably comprises a plurality of rolls 18ª, certain of which are driven, rotatably mounted at their inner ends in bearings provided on the standard 3, (the outer ends of the rolls being rotatably mounted in a plate 18ᵇ supported in spaced relation to the standard 3), and a pair of rolls 20′ interposed between the rolls 18ª and the free end of the platen 8.

19 indicates devices for adjusting one of the rolls 18ª to increase the pressure thereof on the materials, to complete the consolidation thereof. The adjusting devices 19 operatively engage the bearings for one roll 18ª and preferably move it into engagement with two adjacent rolls 18ª, as shown in Fig. 1.

The core structure 4 is removably mounted upon a chuck 21, which in turn is supported upon and driven by a shaft rotatably mounted in bearings in a housing 22, which extends outwardly from the standard 3. The shaft for the chuck is driven through suitable driving connections extending through the housing 22 and standard 3 and connected to a motor (not shown) mounted on the base 1.

The chuck 21 is provided with a plurality of arms 21ª preferably extending radially and movable or adjustable for a purpose which will later appear.

The bead rolling down devices 26 are preferably mounted upon an arm 26ª pivoted at its inner end to the housing 22. The rolling down devices include suitable rollers 26ᵇ, which engage the bead portions a of the web to press them against the sides of the core body 5.

The rolling down mechanism 27 is slidably mounted in guides 28 carried by the standard 3 so as to move substantially in a radial direction toward and from the core body 5. The rolling down mechanism 27 is connected to the free end of a lever 29, which is slidably and pivotally connected at its lower end to the base 1, as shown at 30. Intermediate its ends, the lever 29 is connected to a rod 31 which carries at its inner end a piston mounted in a cylinder 32. The cylinder 32 is provided with valved controlled ports for the admission of compressed air or other medium, whereby the rod 31 may be operated to swing the lever 29 and thus move the rolling down mechanism 27 into and out of operating position. The cylinder 32 is preferably trunnioned between the standard 3 and a bracket 33, so that it may accommodate itself to the position of the lever 29 as the latter is operated.

34 indicates a valve mechanism for controlling the compressed air to the bead rolling down devices 26, the body rolling down mechanism 27 and cylinder 32.

40 indicates a roller rotatably mounted between spaced arms 36 (one only being shown) and substantially midway between the consolidating mechanism 18, (or that roll 18ª thereof from which the web A is delivered), and the guide 20. The roll 40 is loosely mounted on a shaft 41 supported at its opposite ends in standards 42. The guide 20 is supported to extend over a portion of the core 17 so as to guide the body portion of the web on to the core body to or beyond the point at which the bead portions thereof contact with the sides of the core body.

Of the core structure 4, 5 indicates the core body, already referred to. The core body may be formed from a flexible body or it may consist of collapsible sections; but by preference it comprises a plurality of sections rigidly connected together. The core body is preferably round in cross section and hollow to reduce its weight and cost. The inner portion of the core body 5 is provided with an inwardly extending flange 6 to the opposite side faces of which the bead rings 4′ are removably clamped, as will be later set forth. The opposite side faces of the flange 6 are provided with annular ribs 7 9ª. As the core body 5 and flange 6, are by preference made in sections (see abutting ends 5′ of two sections in Figs. 1 and 2) and these sections are assembled together end to end, it will be seen that the rings 9ª engage the ribs 7 and thus serve to connect the sections in fixed relationship. The rings 9ª are connected to the ribs 7 by bolts 10, which pass through transverse openings formed in these parts. The inner periphery of the flange 6 is formed with a groove 6ª, which receives the free end of the chuck arms 21ª when the latter are moved outwardly to removably engage the flange 6 and thus support the core body 5 on the chuck 21. The bead rings 4′ are, as already described, clamped to the opposite sides of the flange 6 so as to co-operate with the inner or under portions of the core body 5 to form bead pockets 4ª, as shown in Figs. 3, 8 and 10. The outer surfaces or walls of the bead rings 4′ are preferably disposed at right angles to the plane of the core body 5 or parallel to the axis of the core structure, and extend laterally in opposite directions from the flange 6, it being desirable to wind the beads a helically on the bead rings in side by side relation under tension with their free edges in engagement with the bead rings (see Fig. 3), so that in the completed carcass bead structures of the desired shape and size will be formed around the two sides of the carcass. The bead rings 4′ are removably secured or clamped to the flange 6 by clamping devices indicated as an entirety at 11, these devices being preferably carried by the rings. The bead rings 4′ are substantially similar in construction, being slightly modified so as to receive and support the respective elements of the clamping devices 11, as will be later set forth. Each bead ring 4' comprises a main member 12 and a plurality of bead engaging or positioning members 13 mounted to move on the main member 12 inwardly, radially, to effect their dis-engagement from the beads, after the carcass is completely wound and thereby permit the ready dis-assembly of the bead rings 4' and removal of the core body 5 and carcass thereon. For this purpose the outer portion of the main member 12 of each ring 4' is inclined inwardly toward its inner edge to form an annular, conical wall as indicated at 14; whereas the bottom walls of the bead engaging members 13 correspond in shape to the wall 14 and slidably fit thereon. By preference, the main member 12 is provided with an up-standing wall 14ª against which the outer circumferential edge of the bead engaging members 13 abut, so that when the rings 4' are clamped against the flange 6 (see Fig. 3), the bead engaging members 13 are clamped between the walls 14ª of the main members 12 and flange 6 and are thus held in rigid relation thereto; but when the clamping devices 11 are released, which is the first step or operation in removing the core body 5, the ring members 12 separate sufficiently, under the influence of the pressure of the beads on the sections 13, to permit the bead engaging members 13 to slide down the conical walls 14 and thus become disengaged from the beads a, as shown in Fig. 6, this relative movement being also due in part to the friction between the beads and members 13 and tending to prevent movement thereof with the members 12. In other words, it will be seen that when the bead rings are released from each other, and the main members 12 move outwardly or away from each other, the bead engaging members 13 move inwardly, that is, they contract circumferentially and thus readily disengage the beads a. As will be later described, the clamping devices 11 operate by cam action to secure the bead rings 4' in operative relation at opposite sides of the flange 6 and the beads a are wound on the bead rings under tension, so that when the clamping devices 11 are released, the circumferential tension of the beads will tend to separate the bead ring members 12 and cause a contraction of the bead engaging members 13. As a result, the bead rings will immediately be released from the beads and they can be dis-assembled in a quick and ready manner. Due to the fact that the bead engaging members 13 of the bead rings contract circumferentially, they are made in sections and the ends of the sections are separated to admit of this movement. For this purpose, I slidably connect the bead engaging members 13 of each ring to the main member 12, such slidable connections comprising screw-threaded openings formed in the members 13 and screws 15 supported therein, the shanks of which screws slide in elongated slots 16 formed in the main member 12. The slots 16 are enlarged to form shoulders 16ª, that are engaged by the heads of the screws 15 which thus prevent dis-engagement of the members 13 from the member 12. The bead engaging members 13 preferably extend entirely around the main member 12 except along a section of the bead rings opposite the bead clamping devices, indicated as an entirety at 17. Along this portion of the bead ring 4', the main member 12 is provided with a bead engaging member 13ª fixed thereto by one or more screws 13ᵇ.

17ª indicates a plate extending inwardly and preferably formed integrally with the main member 12 and forming in connection with the main member 12 and section 13ª a support for the clamping devices 17. The bead clamping devices 17 comprise a clamping plate 17ᵇ that is preferably flat and adapted to engage the beads a of the first ply of material to connect its free end to the under side 5ª of the core body 5 in the bead pocket 4ª formed between it and the adjacent bead ring 4', and a pair of toggle members 17ᶜ, 17ᵈ, the former being pivoted to the plate 17ᵇ and the latter being connected to a lever 17ᵉ, fulcrumed on the depending plate 17ª. As shown in Figs. 8, 9, 10, and 11, the walls of the main member 12, section 13ª and plate 17ª are hollowed out or cut away to accommodate the clamping devices 17 and the plate 17ª is provided with suitable lugs 17ª' to support the opposite ends of the pivot for the lever 17ᵉ. The lower horizontal edge of the plate 17ᵇ is disposed between an abutment 12ª and the adjacent side face of the flange 6, so that the lower edge of the plate may engage therewith and be rocked when the toggle is operated; that is, when the lever 17ᵉ is operated downwardly to the position shown in Fig. 8, the toggle is extended and operates to move the plate 17ª toward the core body 5; hence through the engagement of the lower edge of the plate 17ᵇ with the flange 6, the upper edge of the plate 17ª is swung about such point of engagement as a fulcrum and caused to engage the bead a and clamp it against the under side of the core body 5; whereas when the toggle is operated in the opposite direction, the lower edge of the plate 17ᵇ engages the abutment 12ª and thus swings the upper edge of the plate away from the core body 5, as shown in Fig. 10, which position it occupies while the free end of the web A is being positioned on the core body in the operation of starting the winding of a new carcass. The toggle member 17ᶜ is preferably formed of two elements, one having an axially arranged screw-threaded opening and the other comprising a threaded shank fitting therein so that the length of the member may be adjusted to effect the proper and effective operation of the plate $17^b$.

I preferably provide three clamping devices 11 and space them around each bead ring 4′, as will be understood from Figs. 1 and 2. As the clamping devices are similar in construction, it will only be necessary to describe one thereof. Each bead ring is provided with a supporting member 23, which is preferably formed integrally with and extends inwardly from the main member 12, and adapted to align with one of the supporting members on the other ring 12. The lower ends of each two aligned supporting members 23 are provided with laterally extending hollow bosses $23^a$. The opening in the boss of one ring slidably and rotatably receives a rod 24 which carries at its outer end a handle $24^a$ and at its inner end a laterally extending lug 25. The handle $24^a$ is disposed on the outer side of the supporting member 23 and by preference the inner end of the adjacent boss $23^a$ is recessed at $23^{a'}$ to receive the lug 25, when the rod 24 is withdrawn (see Fig. 7), thus eliminating any obstruction between the bosses $23^a$ when the rings 4′ are assembled or disassembled. The opening in the boss $23^a$ of the other ring is enlarged as shown at $23^{ax}$, so as to provide a space through which the lug 25 moves when the rod 24 is moved endwise to position the lug at the outer side of the other ring 4′ or its supporting member 23. $25^a$ indicates a plate secured to the outer face of the other bead ring 4′ and formed with an opening preferably corresponding in shape to the opening $23^{ax}$ in the adjacent boss $23^a$. The plate $25^a$ is secured to the outer side or face of the adjacent supporting member 23 by a plurality of screws $25^b$. Surrounding the opening in the plate $25^a$ is a cam 25′ adapted to be engaged by the inner edge of the lug 25, so that after the rod 24 is moved endwise through the bosses $23^a$ to the position shown in Fig. 6, and then rotated, the lug 25 will ride the cam 25′ and thus co-operate with the hub $24^{a'}$ of the handle $24^a$ to clamp the bead rings 4′ together and effect a clamping engagement thereof against the flange 6, as shown in Fig. 3. The plate $25^a$ is preferably formed of hardened steel or other suitable material.

As will be understood from Figs. 1 and 2, one clamping device 11 is mounted in the plate $17^a$, so that in the provision of three clamping devices 11 only two supporting members 23 for each ring will be required.

Since the free end of the web A is cut at an angle along a line that is parallel to the lay of the cords of one layer of each ply of material, I arrange the plates $17^a$ so as to support the clamping devices 17, one in advance of the other, as clearly shown in Figs. 1 and 2, whereby the bead clamping devices will be in position to engage the free ends of the beads $a$ at opposite sides of the core body 5. In carrying out this arrangement, the clamping devices 11 are arranged so that the bead rings 4′ for each core structure will be similar in construction in all respects except in the forming of the bosses so that one boss will movably support one clamping element comprising the rod 24, handle $24^a$ and lug 25, and the other boss will support the other clamping element constituting the plate $25^a$ and cam 25′ and permit the operation of the first mentioned clamping element.

In the operation of winding a carcass, a core body 5 is first positioned on the arms $21^a$ of the chuck 21 and then the bead rings 4′ are assembled and clamped against the opposite sides of the flange 6, as shown in Fig. 3. In assembling the core structure, it is first necessary to position one bead ring on the inner side of the chuck 21 prior to the positioning of the core body 5 thereon. In actual practice a core body 5 is used for each carcass that is made, whereas only a single pair of bead rings 4′ is required, since they are assembled and dis-assembled for each core body, the inner bead ring 4′ being allowed, when dis-assembled, to rest on some part of the chuck 21 or the housing 22 for its shaft while the removal of the core body 5 is being effected and a new one substituted.

Following the assembly of the core structure, the free end of the web A is drawn forward over the guide 20 and the bead ends positioned opposite the clamping devices 17, then the latter are operated as shown in Fig. 8. Next the chuck 21 is rotated and the winding of the web A on the core structure 4 continues until the desired number of plies (three being shown applied in Fig. 2) are wound thereon, the rotation of the chuck and feed of the web A being correlated to insure tensioning of the beads and body portion to the desired extent. Thereafter the web is severed and the severed end laid on the wound portions and then, if desired, the chuck may be rotated with the body portion rolling down devices 27 in operating position to compress the layers and the outer end of the wound section closely together. Then the chuck 21 is stopped, the bead rings 4′ are unclamped and dis-assembled, and then the chuck arms $21^a$ are dis-engaged from the core body and the latter removed.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a core body, bead rings extending around opposite sides of the core body and co-operating with its under sides to form bead pockets, means for removably clamping said bead rings in fixed relation to said core body, and means for feeding a beaded web to said core structure for winding thereon with the beads tensioned in side by side relation on said rings.

2. In apparatus of the class described, the combination of a core, a pair of bead rings adapted to be disposed upon the opposite sides of said core and co-operating with the under sides thereof to form bead pockets, each said ring comprising a main member, a bead engaging member movable relative thereto and means between the members of each ring for limiting their relative movement, and means for removably clamping said rings in operative relation to said core.

3. In apparatus of the class described, the combination of a core body on which material is convolutely wound, a flange extending inwardly from said body, a pair of annular bead rings adapted to engage the opposite sides of said flange and co-operating with the under sides of said core body to form bead pockets, means for removably clamping the bead rings in fixed relationship to said flange, and a device on each ring for securing the adjacent edge of the material at its free end to the core body, the device on one ring being disposed angularly of said body relative to the securing device on the other ring.

4. In apparatus of the class described, the combination of a core body, a pair of bead rings disposed in operative relationship to the undersides of said core body, each said bead ring comprising a main member and a bead engaging member movable relative to said main member, coordinated means for rotating said core body and feeding beaded material thereto to wind the beads of the material on the bead engaging members under tension, whereby upon releasing said bead rings the bead engaging members are forced inwardly to effect their disengagement from the beads, and means for removably clamping said bead rings in fixed relation to said core body.

5. In apparatus of the class described, the combination of a core body, a pair of bead rings disposed in operative relationship to the under sides of said core body to form bead pockets, each said bead ring comprising a main member having a conical outer wall, a bead engaging member slidably fitting said wall, coordinated means for rotating said core body and feeding bead material thereto to wind the beads of the material on the bead engaging members under tension, whereby upon the release of said bead rings the bead engaging members are forced inwardly to effect their disengagement from the beads, and means for removably clamping said bead rings in operative relationship to said core body.

6. In apparatus of the class described, the combination of a core body, a pair of bead rings disposed in operative relationship to the under sides of said core body to form bead pockets, each said bead ring comprising a main member having a conical outer wall, a bead engaging member comprising sectional elements slidably fitting said wall, coordinated means for rotating said core body and feeding beaded material thereto to wind the beads of the material on the bead engaging members under tension, whereby upon releasing said bead rings the bead engaging members are forced inwardly to effect their disengagement from the beads, and means for removably clamping said bead rings in operative relationship to said core body.

7. In apparatus of the class described, the combination of a core body, a pair of bead rings disposed on opposite sides of said body in operative relationship to the under portions thereof and arranged to form bead pockets, said rings being provided with inwardly extending members forming hollow bosses, each boss of one ring being arranged to align with a boss of the other ring, and an element extending through said bosses and engaging therewith to removably clamp said bead rings in operative relation to said core body.

8. In apparatus of the class described, the combination of a core body, a pair of bead rings arranged to be disposed on opposite sides of said body in operative relationship to the under portions thereof to form bead pockets, said rings being provided with inwardly extending members forming hollow bosses, each boss of one ring arranged to align with a boss of the other ring, and means for clamping said bead rings in operative relation to said core body, said clamping means comprising a cam carried by one boss and a rod rotatively and slidably mounted in the other boss, whereby it may be moved into engagement with said cam and rotated to effect the clamping action.

9. In apparatus of the class described, the combination with a rotatable support, of a core structure mounted on said support, said core structure comprising a core body having an inwardly extending flange with which the elements of said support removably engage, bead rings mounted on opposite sides of said flange, means for clamping said bead rings in fixed relationship to said flange to form bead pockets around the under sides of the core body, a swingable device having a portion disposed between said core structure and each bead ring and another portion overlapping the edge of the material to be wound on the core structure and arranged to engage and disengage therewith, and means for operating said device.

10. In apparatus of the class described, the combination with a frame, a chuck rotatively mounted thereon and means for rotating said chuck, of a core structure removably mounted on said chuck, said core structure comprising a core body having an inwardly extending flange with which the elements of said chuck engage, bead rings mounted on opposite sides of said flange, and clamping means between and engaging said bead rings for clamping them in fixed relationship to said flange to form bead pockets around the under sides of the core body.

11. In apparatus of the class described, the combination of a frame, a chuck rotatively mounted on said frame, a core structure mounted on said chuck and adapted to be rotated thereby, and means disposed at opposite sides of said core structure for engaging and clamping the free end of the material at its opposite sides to the opposite sides of the core body.

12. An apparatus as claimed in claim 11 in which are provided removable bead rings at the opposite sides of said core structure and the material clamping means are carried by said rings.

13. In apparatus of the class described, the combination of a frame, a chuck rotatively mounted on said frame, a core structure mounted on said chuck on which material is convolutely wound, said core structure comprising bead rings disposed at opposite sides of the core body and forming therewith bead pockets, and means for removably clamping said bead rings in fixed relationship to said core body, each said ring being provided with sections arranged to contract circumferentially upon the release of said clamping means.

14. In apparatus of the class described, the combination of a frame, means on said frame for feeding and supplying tire forming material, a chuck rotatively mounted on said frame, a core structure mounted on said chuck on which the material is convolutely wound, said core structure having bead rings disposed at opposite sides of the core body and forming therewith bead pockets, means for removably clamping said bead rings in fixed relationship to said core body, and a clamping device carried by one of said bead rings for engaging the free end of the material to clamp it against the core structure.

15. In apparatus of the class described, the combination of a frame, means on said frame for feeding and supplying tire forming material, a chuck rotatively mounted on said frame, a core structure mounted on said chuck on which the material is convolutely wound, said core structure having bead positioning rings disposed at opposite sides of the core body and forming therewith bead pockets, means for removably clamping said rings in fixed relationship to said core body, and a clamping device carried by one of said rings and arranged to engage the free end of the material at one side and secure it to the under side of the core body.

16. In apparatus of the class described, the combination of a frame, means on said frame for feeding and supplying tire forming material, a chuck rotatively mounted on said frame, a core structure mounted on said chuck on which the material is convolutely wound, said core structure having bead rings disposed at opposite sides of the core body and forming therewith bead pockets, means for removably clamping said bead rings in fixed relationship to said core body, and a clamping device carried by each bead ring and arranged to engage the free end of the material at one side and secure it to the under side of the core body, said clamping devices being disposed in angular relationship to each other.

17. In apparatus of the class described, the combination of a frame, means on said frame for feeding and supplying tire forming material, a chuck rotatively mounted on said frame, a core structure mounted on said chuck on which the material is convolutely wound, said core structure having bead positioning rings disposed at opposite sides of the core body and forming therewith bead pockets, means for removably clamping said bead rings in fixed relationship to said core body, and a clamping device carried by one of said rings and arranged to engage the free end of the material at one side and secure it to the under side of the core body, said clamping device comprising a plate having its lower end operatively connected to the core structure, a toggle for swinging the upper end of the plate into and out of operative position and a lever connected to said toggle and pivotally mounted on said bead ring.

18. In apparatus of the class described, the combination of a frame, a mechanism for feeding beaded material, a chuck rotatably mounted on said frame, a core structure on said chuck and comprising a core body and laterally extending removable bead rings, each having relatively movable sections on which the beads of the material are wound in side by side relation, means for clamping the bead rings in fixed relation to said core body, and means for operating said feeding mechanism and chuck in correlation to effect winding of the beads of the material on said sections under tension, whereby upon the release of said clamping means said sections contract circumferentially.

19. In apparatus of the class described, the combination of a frame, a mechanism for feeding material in web form, a chuck rotatably mounted on said frame, a core body mounted on said chuck, rings having conical outer walls, means for clamping said rings in fixed relation to said core body, a plurality of ring sections slidably fitting said conical outer wall, and means for operating said feeding mechanism and chuck in correlation to effect winding of the edges of the material on said sections in side by side relation under tension, whereby upon the release of said clamping means said sections contract circumferentially.

20. In apparatus of the class described, the combination of a frame, a core body rotatably supported on said frame, means for feeding tire material thereto, rings upon which the edges of the material are wound in side by side relation, means for removably clamping the rings in fixed relation to said core body, and means for operating said feeding mechanism and core to effect winding of the material upon said core body and the edges thereof upon said rings under tension.

In testimony whereof, I have hereunto subscribed my name.

HOWARD I. MORRIS.